United States Patent
Wu et al.

(10) Patent No.: US 10,628,066 B2
(45) Date of Patent: Apr. 21, 2020

(54) ENSURING IN-STORAGE DATA ATOMICITY AND CONSISTENCY AT LOW COST

(71) Applicant: ScaleFlux, Inc., San Jose, CA (US)

(72) Inventors: Qi Wu, San Jose, CA (US); Qing Li, San Jose, CA (US); Jiangpeng Li, San Jose, CA (US)

(73) Assignee: SCALEFLUX, INC, San Jose, CA (US)

( * ) Notice: Subject to any disclaimer, the term of this patent is extended or adjusted under 35 U.S.C. 154(b) by 59 days.

(21) Appl. No.: 15/984,538

(22) Filed: May 21, 2018

(65) Prior Publication Data

US 2018/0357004 A1 Dec. 13, 2018

Related U.S. Application Data

(60) Provisional application No. 62/516,615, filed on Jun. 7, 2017.

(51) Int. Cl.
*G06F 3/06* (2006.01)
*G06F 12/02* (2006.01)
*G06F 12/1018* (2016.01)

(52) U.S. Cl.
CPC ............ *G06F 3/0638* (2013.01); *G06F 3/061* (2013.01); *G06F 3/0614* (2013.01); *G06F 3/0659* (2013.01); *G06F 3/0679* (2013.01); *G06F 12/0246* (2013.01); *G06F 12/1018* (2013.01); *G06F 2212/7202* (2013.01)

(58) Field of Classification Search
CPC ............ G06F 12/0246; G06F 12/1018; G06F 3/0614; G06F 3/0638; G06F 3/0659; G06F 3/0679; G06F 3/061; G06F 2212/7202
See application file for complete search history.

(56) References Cited

U.S. PATENT DOCUMENTS

| | | | |
|---|---|---|---|
| 7,484,017 B1* | 1/2009 | Young ................... | G06F 13/385 710/112 |
| 2012/0102297 A1* | 4/2012 | Haines ................ | G06F 12/0246 711/209 |
| 2017/0371660 A1* | 12/2017 | Smith ................. | G06F 9/30043 |

* cited by examiner

*Primary Examiner* — Baboucarr Faal
*Assistant Examiner* — Jane Wei
(74) *Attorney, Agent, or Firm* — Hoffman Warnick LLC

(57) ABSTRACT

A storage infrastructure and method for efficiently handing block I/O requests. An infrastructure is described that includes flash memory and a controller that includes: a two dimensional (2D) linked list structure for temporarily storing BIO requests, wherein each BIO request specifies a set of LBAs and wherein the 2D linked list structure includes N vertical linked lists; a BIO request loader that applies a hash function to each LBA in a received BIO request to associate each LBA to one of N hash values, and loads the received BIO request into a horizontal linked list in the 2D linked list structure in which each LBA resides within a vertical linked list based on an associated hash values; and a linked list manager that determines which LBAs in the 2D linked list structure are eligible for processing and when a horizontal linked list can be removed.

18 Claims, 3 Drawing Sheets

ENSURING IN-STORAGE DATA ATOMICITY AND CONSISTENCY AT LOW COST

PRIORITY CLAIM

This application claims priority to co-pending provisional application entitled, METHOD FOR ENSURING IN-STORAGE DATA ATOMICITY AND CONSISTENCY AT LOW COST, Ser. No. 62/516,615, filed on Jun. 7, 2017, the contents of which are hereby incorporated by reference.

TECHNICAL FIELD

The present invention relates to the field of solid-state data storage devices, and particularly to enhanced storage device controllers that provide data atomicity and consistency at low latency cost.

BACKGROUND

Solid-state data storage devices, which use non-volatile NAND flash memory technology, are being pervasively deployed in various computing and storage systems. In addition to one or multiple NAND flash memory chips, each solid-state data storage device must contain a controller (in-storage) that manages all the NAND flash memory chips. The storage device controller aims to optimally serve the user I/O requests with the best possible performance. Meanwhile, the storage device controller is also responsible for background operations such as garbage collection (GC), which invoke extra flash memory read/write activities. When scheduling all these flash memory read/write activities in response to normal I/O requests and internal background operations, the storage device controller may include logic to rearrange the order of I/O request processing. The rearrangement could however introduce data atomicity and consistency issues in which data is processed in a detrimental manner.

In current practice, applications and operating systems typically apply write barriers (e.g., the fsync system call) to I/O requests so that storage device controllers will not introduce any atomicity and consistency issues no matter how storage devices rearrange the processing order. This however tends to come with a significant system performance penalty. Moreover, such write barriers cannot deal with the case when background operations inside storage devices (e.g., GC) are triggered.

SUMMARY

Accordingly, the present disclosure is directed to a solution for improving storage infrastructures and storage device controllers to ensure data atomicity and consistency at low cost.

A first aspect provides a storage infrastructure for processing block I/O (BIO) requests from a host, comprising: flash memory; and a controller that includes: a two dimensional (2D) linked list structure for temporarily storing BIO requests, wherein each BIO request specifies a set of logical block addresses (LBAs) and wherein the 2D linked list structure includes N vertical linked lists; a BIO request loader that applies a hash function to each LBA in a received BIO request to associate each LBA to one of N hash values, and loads the received BIO request into a horizontal linked list in the 2D linked list structure in which each LBA resides within a vertical linked list based on an associated hash values; and a linked list manager that determines which LBAs in the 2D linked list structure are eligible for processing and when a horizontal linked list can be removed.

A second aspect provides a method of processing block I/O (BIO) requests, comprising: receiving at a controller BIO requests from a host to perform a read/write operations in a flash memory, wherein each BIO request specifies a set of LBAs; providing in the controller a two dimensional (2D) linked list structure for temporarily storing BIO requests, wherein the 2D linked list structure includes N vertical linked lists; applying a hash function to each LBA in a received BIO request to associate each LBA to one of N hash values; loading the received BIO request into a horizontal linked list in the 2D linked list structure in which each LBA resides within a vertical linked list based on an associated hash values; and determining which LBAs in the 2D linked list structure are eligible for processing and when a horizontal linked list can be removed.

A third aspect provides a controller card for processing block I/O (BIO) requests from a host to perform read/write operations on a flash memory, comprising: a two dimensional (2D) linked list structure for temporarily storing BIO requests, wherein each BIO request specifies a set of LBAs and wherein the 2D linked list structure includes N vertical linked lists; a BIO request loader that applies a hash function to each LBA in a received BIO request to associate each LBA to one of N hash values, and loads the received BIO request into a horizontal linked list in the 2D linked list structure in which each LBA resides within a vertical linked list based on an associated hash values; and a linked list manager that determines which LBAs in the 2D linked list structure are eligible for processing and when a horizontal linked list can be removed.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
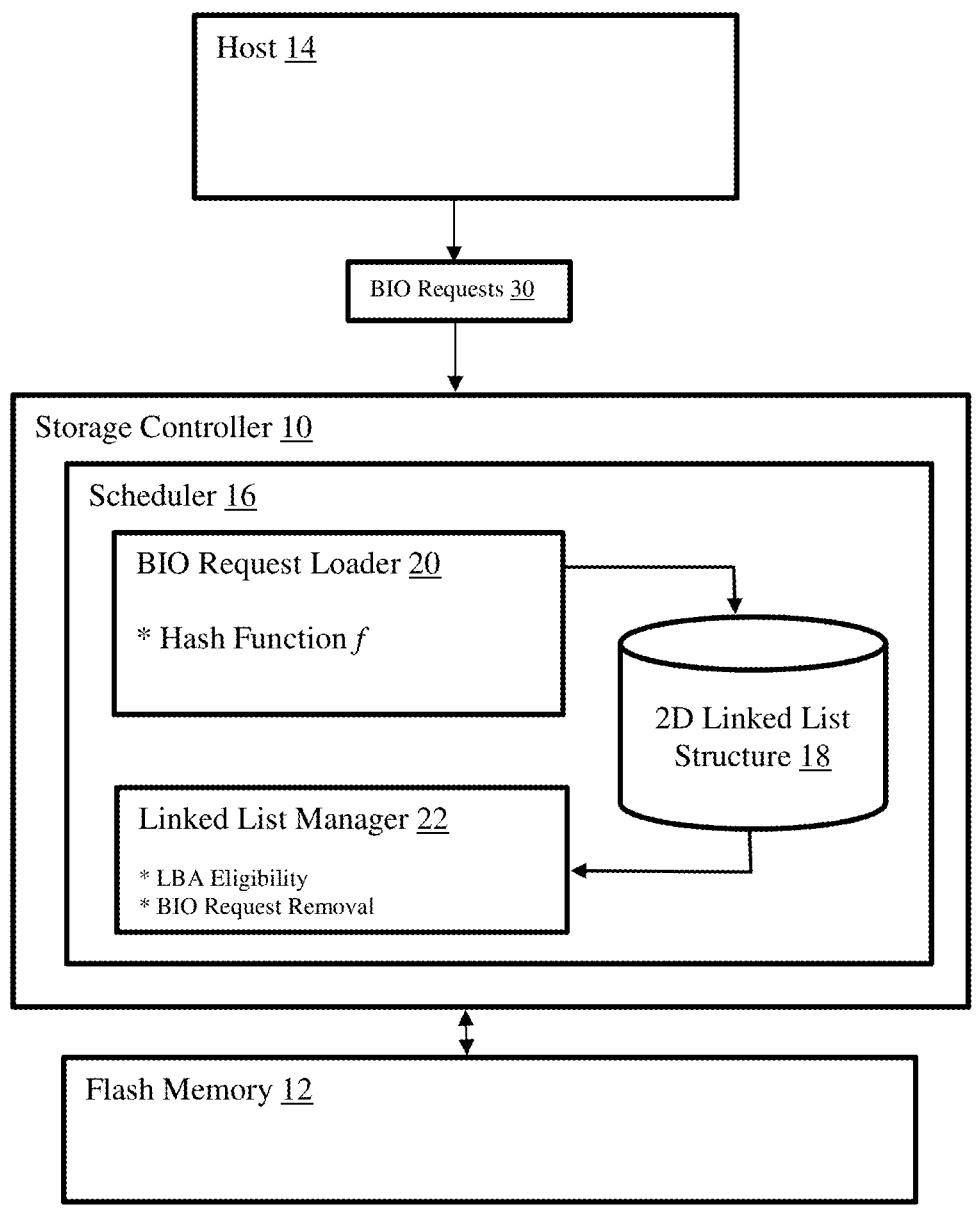
FIG. 1 depicts a storage infrastructure according to embodiments.

Shown in FIG. 1 is a storage infrastructure in which a host 14 issues block I/O requests 30 to a storage controller 10 to read or write a set of data blocks to a solid state memory, i.e., flash memory 12. Each BIO request 30 specifies a set of logical block addresses (LBAs) that require processing. In typical practice, a given I/O request may be associated with one or multiple BIO requests 30, and each BIO request 30 contains a number of consecutive LBAs. Storage controller 10 includes a scheduler 16 that is responsible for determining the order in which LBAs are to be processed to optimize performance (e.g., speed) while ensuring atomicity and consistency behaviors.

Because storage controller 10 may be handling BIO requests 30 from multiple applications, as well as performing internal background operations, it is possible that the same LBA may be processed by multiple requests. In such a case, it is critical that the requests are handled in the correct order. For example, an LBA in a write operation must be processed before the same LBA can be processed by a subsequent read operation. At the same time, LBAs not subject to prior unfulfilled requests should be processed as soon as possible, which means that processing of some LBAs should be forced to wait, while other should not.

In order to achieve this, scheduler 16 utilizes a two-dimensional (2D) link list structure 18 within the storage controller 10 to manage BIO requests 30 (and internal background operations such as GC). The 2D link list structure 18 allows BIO requests 30 to be tracked and managed at both the BIO level and the LBA level to provide enhanced performance while maintaining necessary atomic and consistency behaviors at a very low implementation cost. As shown, when a BIO request is received by the storage controller 10, a BIO request loader 20 implements a hash function to hash each LBA into one of N integer values, which is used to load/index the LBA in the 2D link list structure 18. Each subsequent BIO request 30 is likewise loaded into 2D link list structure 18 using the same hash function on their LBAs such that the same LBA from different BIO requests 30 have the same hash value. At the same time, linked list manager 22 inspects the 2D linked list structure 18 and determines which LBAs are available for processing and which BIO requests 30 have been completely processed and can be removed.

Figure 2:
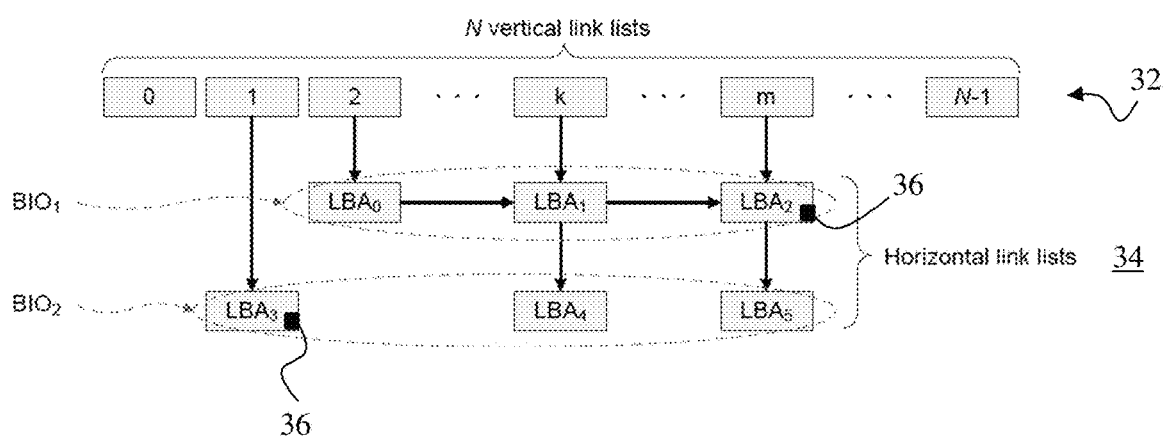
FIG. 2 illustrates a hashed two-dimensional link list structure according to embodiments.

FIG. 2 depicts an illustrative 2D link list structure 18 having two BIO requests ($BIO_1$ and $BIO_2$) loaded therein. Structure 28 generally includes a top row 32 that specifies N different vertical positions, and a series of horizontally loaded BIO requests below the top row in newer BIO requests are placed lower and lower in the structure, i.e., $BIO_1$ was received before $BIO_2$.

The BIO request loader 20 (FIG. 1) provides a hash function $f$ that hashes each LBA in a BIO request into one of N different possible values (e.g., 0 . . . N−1). As each new BIO request is received, their LBAs are horizontally loaded into a unique row (i.e., a horizontal linked list 34) with vertical positions corresponding to their hash values. For example, $BIO_1$ resides in a first row and has three LBAs at vertical positions 2, k and m; and $BIO_2$ resides in a second row and has three LBAs at vertical positions 1, k and m. Note that because $LBA_1$ from $BIO_1$ and $LBA_4$ from $BIO_4$ have the same hash value, it is presumed that they refer to the same LBA and therefore require specialized handling.

As noted, N denotes a predefined positive integer (e.g., 4096), and the 2D linked list structure 18 maintains N vertical link lists, the head 32 of each vertical link list has a unique number between 0 and N−1. Assume the hash function $f$ hashes one LBA to an integer falling between 0 and N−1. Let M denote the maximum number of LBAs within one BIO request. The hash function $f$ is constructed in such a way that any consecutive M LBAs are hashed to M different values. For a BIO request with n consecutive LBAs, the BIO request loader 20 applies the hash function $f$ to each LBA and obtains the hash results. For an LBA with the hash result h (0≤h≤N−1), the BIO request loader 20 adds the LBA to the tail of the h-th vertical link list (i.e., the vertical link list whose head has the number h). Meanwhile, all the LBAs within the same BIO also form a link list, called a horizontal link list 34.

During run time, upon receiving an I/O request, the BIO request loader 20 sequentially processes all the BIO requests contained in the I/O request, and adds each LBA within one BIO request to the tail of the corresponding vertical link list. For example, $LBA_4$ was added to the tail of vertical linked list k. Meanwhile, all the LBAs in the same BIO request form a horizontal link list 34, as shown. The linked list manager 22 only allows flash memory read/write commands for the LBAs that reach the head 32 of a vertical linked list. Thus for example, $LBA_3$, $LBA_0$, $LBA_1$, and $LBA_2$ are at the head of their respective vertical linked lists, but $LBA_4$ and $LBA_5$ are not. Accordingly, $LBA_4$ and $LBA_5$ are not eligible for processing. In one illustrative embodiment, the linked list manager 22 (FIG. 1) can readily determine which LBAs are eligible for processing, e.g., by scanning through each column, which then reports that information to scheduler 16.

A horizontal linked list 34 will remain in the structure 18 until all the LBAs within the horizontal link list 34 have been processed. Accordingly, after issuing a flash memory read/write command for an eligible LBA, the linked list manager 22 will mark that LBA as "processed" without removing it from the vertical link list. In this example, $LBA_2$ and $LBA_3$ are shown with a black mark 36, indicating they have been processed. The linked list manager 22 will remove all the LBAs within a horizontal link list 34 once all the LBAs are marked accordingly.

As part of the process, the linked list manager 22 scans through the N vertical link lists to ascertain which LBAs are available for processing and scans through the horizontal link lists to determine which BIO requests have been completed. Such a structure and approach can guarantee that only after all the operations associated with one BIO request have been atomically executed, the subsequent operations that may possibly hit to the same LBAs can be executed. This essentially eliminates the possibility of data atomicity and consistency failures, thus providing an improvement in storage technology.

Figure 3:
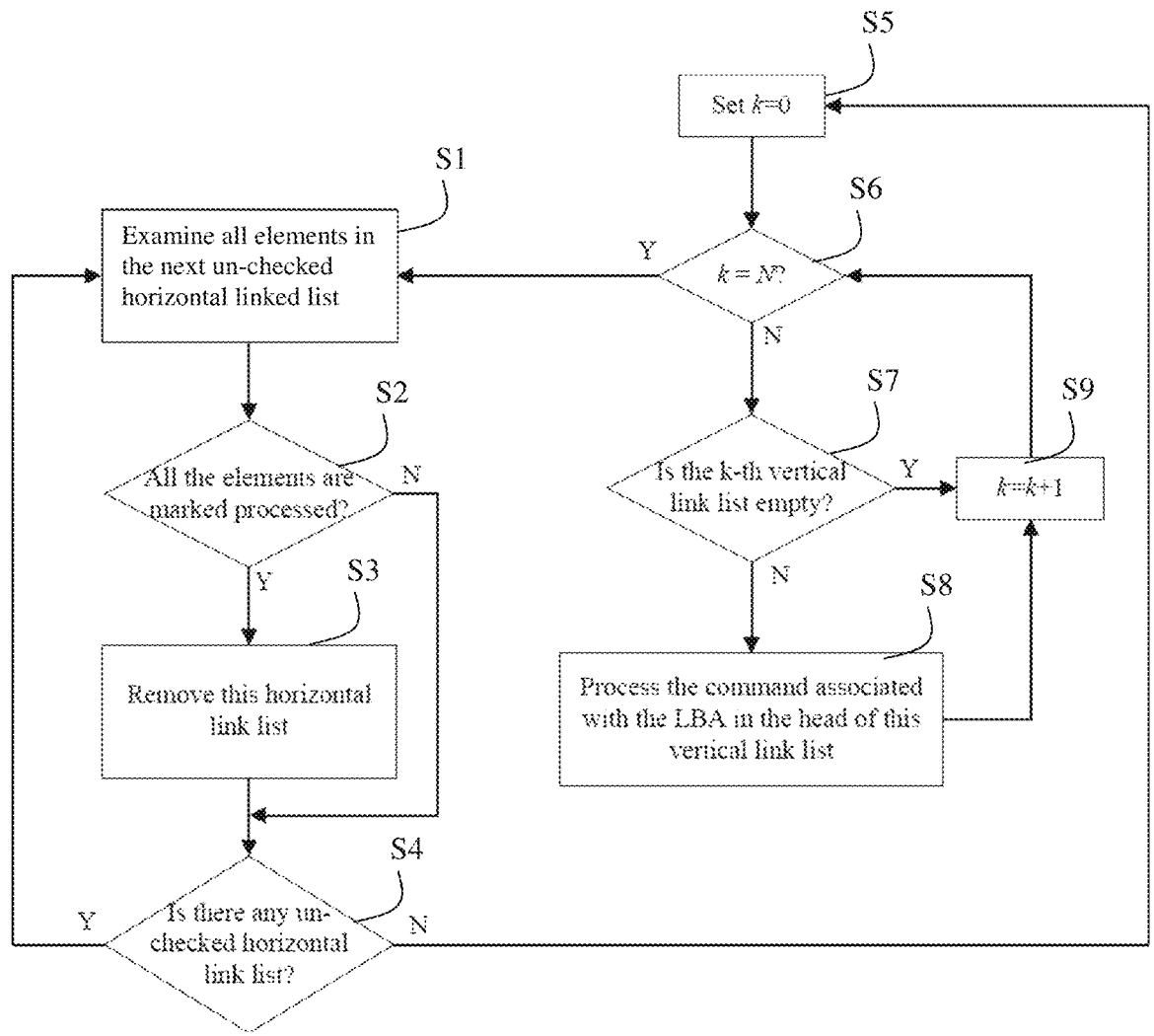
FIG. 3 depicts an operational flow diagram of a process of implementing the hashed two-dimensional link list structure according to embodiments.

FIG. 3 depicts a flow diagram of the operation of the linked list manager 22. The left side (S1-S4) determines whether a horizontal link list (i.e., BIO request) should be removed, and the right side (S5-S9) determines which LBAs can be processed. At S1, all the elements in the next un-checked (i.e., unexamined) horizontal linked list are examined (beginning with the top most and working down). If all the elements are marked at S2 as being processed, then the horizontal linked list is removed at S3. At S4, a determination is made whether any additional un-checked (i.e., unexamined) horizontal linked lists exist. If yes, the process repeats at S1 for the next horizontal linked list.

If no at S4, then the right side of the diagram is implemented to determine which LBAs can be processed, which in this case is done on a column by column basis. Initially, k is set to 0 at S5 and a determination is made whether k=N at S6 (indicating that all vertical linked lists have been processed). If no at S6, then a determination is made whether the k-th vertical linked list is empty. If yes, then k is incremented at S9 and the process repeats at S6. If no at S7, then the command associated with the LBA at the head of the vertical linked list is processed at S8 and k is incremented at S9. The process repeats for each vertical linked list until completed at S6, and when complete, control returns back to S1.

Note that the terms "vertical" and "horizontal" are intended to describe different orientations in a two dimensional data structure, and are not intended to limit the implementation of the invention to a particular directional arrangement based on common definitions. For example, the concept of vertical linked lists and horizontal linked lists may be implemented in a logical space in which the traditional orientations of "vertical" and "horizontal" do not exist. Accordingly, the terms are intended to describe different dimensions (i.e., a first dimension and a second dimension) in a logical structure that can be oriented or implemented in any manner, e.g., using any type of hardware, coding construct, programming array, etc. This similarly applies to the terms rows and columns, which are likewise only intended to describe a first and a second dimension, and should not be interpreted using traditional definitions.

It is understood that the controller 10 may be implemented in any manner, e.g., as an integrated circuit board or a controller card that includes a processing core, I/O and processing logic. Processing logic may be implemented in hardware/software, or a combination thereof. For example, some of the aspects of the processing logic may be implemented using field programmable gate arrays (FPGAs), ASIC devices, or other hardware-oriented system.

Other aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage infrastructure for processing block I/O (BIO) requests from a host, comprising:
   flash memory; and
   a controller that includes:
      a two dimensional (2D) linked list structure for temporarily storing BIO requests, wherein each BIO request specifies a set of logical block addresses (LBAs) and wherein the 2D linked list structure includes N vertical linked lists;
      a BIO request loader that applies a hash function to each LBA in a received BIO request to associate each LBA to one of N hash values, and loads the received BIO request into a horizontal linked list in the 2D linked list structure in which each LBA resides within a vertical linked list based on an associated hash values, and wherein a LBA of a BIO request points to another LBA of the same BIO request within the same horizontal linked list; and
      a linked list manager that determines which LBAs in the 2D linked list structure are eligible for processing and when the horizontal linked list can be removed.

2. The storage infrastructure of claim 1, wherein LBAs eligible for processing must be at a head of the vertical linked list.

3. The storage infrastructure of claim 1, wherein the linked list manager marks an LBA as processed after a corresponding read/write operation associated with the LBA is completed.

4. The storage infrastructure of claim 3, wherein the linked list manager removes the horizontal linked list from the 2D linked list structure when all LBAs in the horizontal linked list are marked as processed.

5. The storage infrastructure of claim 1, wherein the linked list manager determines which LBAs are eligible for processing on a column by column basis.

6. The storage infrastructure of claim 1, wherein the hash function ensures that consecutive LBAs in a BIO request are hashed to different ones of the N hash values.

7. A method of processing block I/O (BIO) requests, comprising:
   receiving, at a controller, BIO requests from a host to perform a read/write operations in a flash memory, wherein each BIO request specifies a set of logical block addresses (LBAs);
   providing, in a controller, a two dimensional (2D) linked list structure for temporarily storing BIO requests, wherein the 2D linked list structure includes N vertical linked lists;
   applying a hash function to each LBA in a received BIO request to associate each LBA to one of N hash values;
   loading the received BIO request into a horizontal linked list in the 2D linked list structure in which each LBA resides within a vertical linked list based on an associated hash values, and wherein a LBA of a BIO request points to another LBA of the same BIO request within the same horizontal linked list; and
   determining which LBAs in the 2D linked list structure are eligible for processing and when the horizontal linked list can be removed.

8. The method of claim 7, wherein LBAs eligible for processing must be at a head of the vertical linked list.

9. The method of claim 7, wherein an LBA is marked as processed after a corresponding read/write operation associated with the LBA is completed.

10. The method of claim 9, wherein the horizontal linked list is removed from the 2D linked list structure when all LBAs in the horizontal linked list are marked as processed.

11. The method of claim 7, wherein determining which LBAs are eligible for processing is done on a column by column basis.

12. The method of claim 7, wherein the hash function ensures that consecutive LBAs in a BIO request are hashed to different ones of the N hash values.

13. A controller card for processing block I/O (BIO) requests from a host to perform read/write operations on a flash memory, comprising:
   a two dimensional (2D) linked list structure for temporarily storing BIO requests, wherein each BIO request specifies a set of logical block addresses (LBAs) and wherein the 2D linked list structure includes N vertical linked lists;
   a BIO request loader that applies a hash function to each LBA in a received BIO request to associate each LBA to one of N hash values, and loads the received BIO request into a horizontal linked list in the 2D linked list structure in which each LBA resides within a vertical linked list based on an associated hash values, and wherein a LBA of a BIO request points to another LBA of the same BIO request within the same horizontal linked list; and
   a linked list manager that determines which LBAs in the 2D linked list structure are eligible for processing and when the horizontal linked list can be removed.

14. The controller card of claim 13, wherein LBAs eligible for processing must be at a head of the vertical linked list.

15. The controller card of claim 13, wherein the linked list manager marks an LBA as processed after a corresponding read/write operation associated with the LBA is completed.

16. The controller card of claim 15, wherein the linked list manager removes the horizontal linked list from the 2D linked list structure when all LBAs in the horizontal linked list are marked as processed.

17. The controller card of claim 13, wherein the linked list manager determines which LBAs are eligible for processing on a column by column basis.

18. The controller card of claim 13, wherein the hash function ensures that consecutive LBAs in a BIO request are hashed to different ones of the N hash values.

* * * * *